Aug. 20, 1940.　　　　J. J. DORKIN　　　　2,211,768
NECKTIE ASSEMBLING APPARATUS
Filed Sept. 30, 1937　　　4 Sheets-Sheet 2

INVENTOR:
J. J. Dorkin
BY
Morrison, Kennedy & Campbell
ATTORNEYS.

Aug. 20, 1940.   J. J. DORKIN   2,211,768
NECKTIE ASSEMBLING APPARATUS
Filed Sept. 30, 1937   4 Sheets-Sheet 4

INVENTOR:
J. J. Dorkin
BY
Morrison, Kennedy & Campbell
ATTORNEYS.

Patented Aug. 20, 1940

2,211,768

UNITED STATES PATENT OFFICE 2,211,768

NECKTIE ASSEMBLING APPARATUS

Joshua Jerome Dorkin, Brooklyn, N. Y., assignor to Handi Necktie Machinery Corp.

Application September 30, 1937, Serial No. 166,533

10 Claims. (Cl. 223—1)

This invention relates to necktie assembling and stitching; and it includes the apparatus or means for assembling the component parts of neckties and for stitching together these components, and as well the novel art, method or system involved, as will be herein disclosed by an illustrative embodiment thereof.

A general object of this invention is to afford a system of necktie manufacture of improved reliability and increased rate of output, with reduced hand labor. A particular object is to expedite and render more convenient the assembling of the necktie components, the silk facing or cover blank and the lining piece, with sometimes a tape, namely, at a remote point or table, preparatory to the clamping together of the assembled components and their transfer and presentation to the stitching mechanism.

A further object is to provide, in intercombination with both the assembling means and the stitching means, a separate work clamping and transferring device which is the only member requiring shifting between the remote assembling point and the place of stitching, and is adapted to be engaged or coupled with both the assembling and the stitching means; through which arrangement a single stitching mechanism may be serviced by several assembling means or tables, and by a larger number of transfer carriers or work clamps.

Another object of the invention is to improve the means and apparatus for assembling the lining and the covering or facing components, with accurate gaging thereof, and with ready adjustability to variations in size or style of work; also with easily effected correction for defects in the covering or silk blank, which defects are known to occur frequently due to the prevailing methods of making up and cutting out such blanks.

Further objects and advantages of the invention will be explained in the hereinafter following description of an illustrative embodiment of the invention or will be apparent to those conversant with the subject. To the attainment of such objects and advantages, the present invention consists in the novel necktie assembling and stitching method or system, and the novel apparatus or means, as well as the novel features of operation, combination, arrangement and construction, herein illustrated or described.

The invention may be utilized with different sorts of stitching means and for convenience is shown combined with a stitching mechanism such as is illustrated in prior application of Hager, Serial No. 27,339, filed June 19, 1935. In said prior application is shown remote assembling of components on a tray having gages and work holding fingers, the whole of which is transferred bodily and attached to the stitching mechanism by complementary couplings. The stitching mechanism comprises an under support for the work with a presser coming down upon it, to hold the work at length; these members being constructed to act as crimping jaws that dispose the work in a wavy form for piercing by a longitudinal needle, the jaws having a needle way, and the thread being thus laid in the form of a slip or loose stitched seam. Said application may be referred to for many details not herein fully illustrated or described. The present invention is in one sense an improvement over the apparatus of the prior application, but as well it may be utilized otherwise and without reference to the features characterizing such apparatus.

In the accompanying drawings

Figures 3, 4, 5:
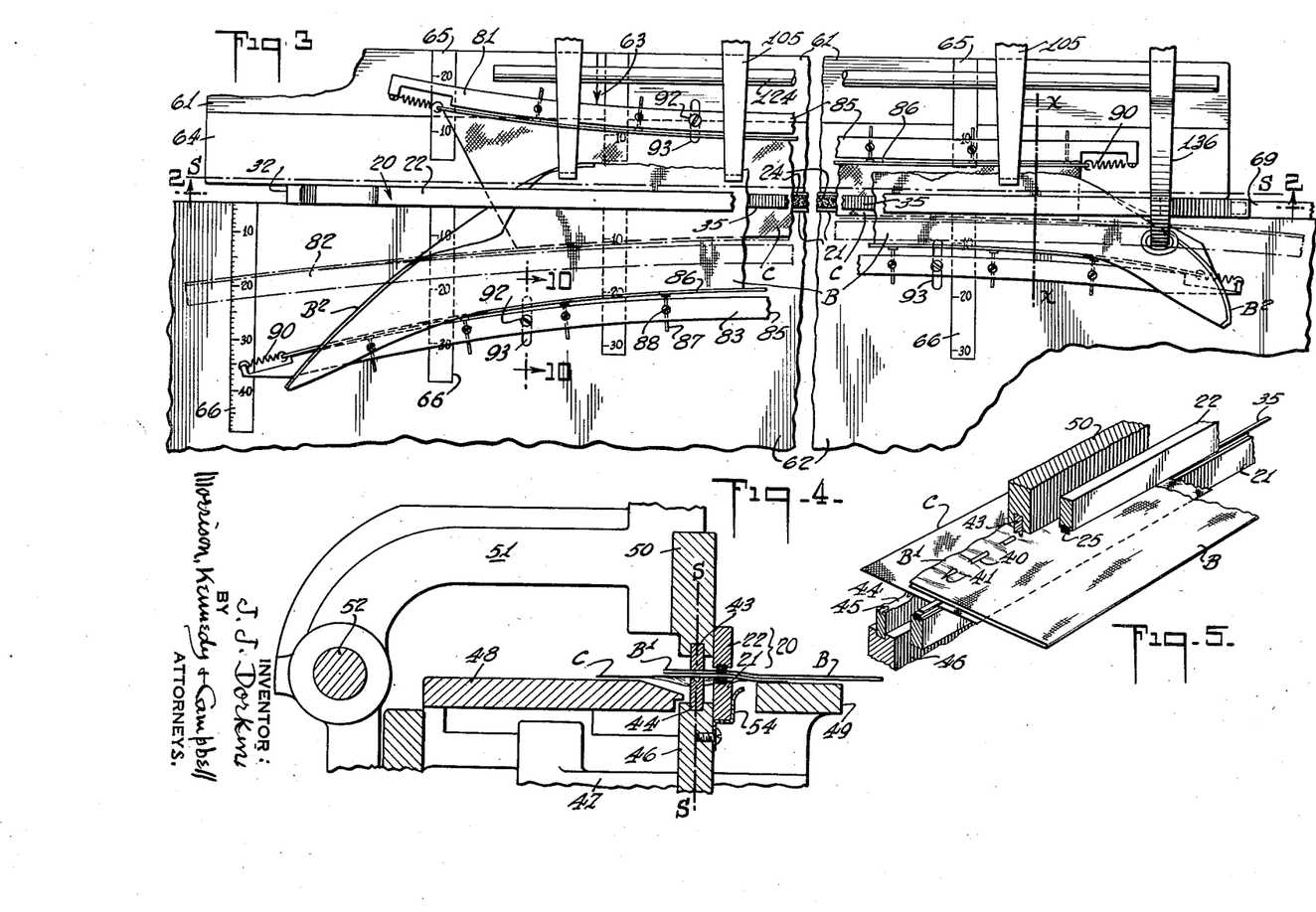
Fig. 3, on a larger scale than Fig. 1, is a top plan view, longitudinally condensed by omission of part of the length of the apparatus, showing the work components assembled and clamped together in readiness to be lifted out for transfer and coupling with the stitching mechanism.
Fig. 4, looking from the left, shows a fore-and-aft vertical section view of a part of the stitching mechanism corresponding generally with Fig. 10 of said prior application Serial No. 27,339, but with the novel transfer device hereof substituted.
Fig. 5 is a partially broken away perspective view of the essential elements of Fig. 4, shown in position with the slip stitch formation in progress, and corresponding in general with Fig. 9 of said prior application.

The work or necktie A and its components are shown in several figures, particularly Figs. 3, 4, 5 and 7. The facing or covering blank B is shown as a refolded or doubled piece of necktie material or silk, the silk being folded reversely, that is, back upon itself, and with the eventual outer side folded inside. This blank may be bias-cut as usual, to afford longitudinal stretch. By this invention the doubled facing component is gaged by its fold or doubled edge, of important utility, the stitching being performed near the other or open edge, and the facing component is shown as having an extended margin B' or excess width beyond the stitching line or axis S indicated in several figures. The silk or facing piece may also be formed with end hems B² as usual, commencing at the extreme tip and extending inwardly to a predetermined point as shown in Fig. 3. Such hem at the wider end of the necktie may herein be used for the initial longitudinal gaging of the facing piece in the assembling apparatus, as by means of a marker or arrow 63, Fig. 3, to be further referred to. The necktie interior component or fabric lining piece C may be stretchable as is usual, for example by being bias-cut.

The relative positioning or superposing of the necktie components is fully indicated, as in Figs. 3, 4, 5 and 7, the lining C being disposed preferably symmetrically with respect to the stitching line S, and the refolded facing B being disposed wholly to one side of the stitching line, with the exception of its extension or margin B' overlying the axis of the lining piece beyond the stitching line. The plan of this invention is to assemble in this manner the components at the assembling part of the apparatus, thereupon clamping them together firmly in their properly assembled relation, and thereupon transferring the clamp and assemblage bodily and coupling them with the stitching mechanism for the laying of the loose stitching through all of the components; following which the stitched necktie may be unclamped and turned inside out and the necktie completed as may be desired.

For convenience the transfer clamp or assemblage carrier 20 will first be described. This comprises an under clamp bar 21 and an upper clamp bar 22 between which the assembled materials are clamped. The under clamp bar is recessed at its upper side to accommodate a friction piece or rubber strip 24, and the upper bar is similarly provided with a rubber strip 25, these strips contacting directly with the clamped materials and holding them firmly against slippage during transfer and stitching.

The under clamp bar 21 is initially laid upon the table of the assembling apparatus as will be described, and after the assembling of the materials the upper bar is hooked or coupled to the under bar for clamping purposes. Thus the under clamp bar at its right end has an upstanding post or yoke 27 formed with a notch or recess 28 adapted to receive a hook or horn 29 formed at the end of the upper bar, which is initially loose and detached. When the upper bar is engaged at the right end, as best shown in Fig. 2, its left end is brought down into clamping position, this being formed with a projecting horn or lug 31 which snaps into engagement with a spring or latch 32, of suitably bent form as shown, which is attached at 33 to the under side of the lower clamp bar. In addition to these clamping parts the transfer device may have an intermediate member or hold-down 35 attached at 36 to the lower bar, at its right end. This thin part may be constructed of any suitable material such as a fabric tape or elastic band but preferably is in the form of a thin metal strip or spring. This thin strip 35 is adapted to be brought down on top of the lining piece when positioned, and thereupon engaged with a latch 37 at its left end, thereby to hold securely the positioned lining and prevent its displacement during the gaging of the facing component. A high fixed bracket 38 at the right, Fig. 1, has a notch 39 to accommodate the hold-down 35 during gaging of the lining.

Referring next to the stitching mechanism, for convenience, the loose stitches are laid longitudinally through the assembled necktie components by a needle 40, in accordance with said prior application. Said needle has its thread receiving eye 41 at its pointed end, and this may be in the form of a hook so that the empty needle may first pierce the fabric, and then receive the thread and retract to form the stitches; or with a closed eye the thread may be applied to the needle either before or after the piercing of the fabric. The stitching mechanism is provided with an upper presser or jaw 43 and an under presser or support 44, which pressers or clamping jaws may be of complementary wavy form, as shown, to produce transverse crimps. The jaw projections may be formed with grooves 45, mutually forming a way through which the needle passes in penetrating the fabric crimps.

The work pressing members or jaws may be cooperatively mounted in any convenient way, for example as in said prior application, the under jaw 44 being mounted upon a fixed support 46, shown mounted upon a machine frame part or bed 47. To the rear of the parts 44 and 46 is shown a work shelf 48, which may be stationary, and to the front is shown an analogous shelf 49, which may be removable; but in the practise of this invention both shelves 48 and 49 may conveniently be omitted since the outstanding fabric portions may conveniently be allowed to hang down during the stitching. The upper jaw 43 is shown mounted at the under side of a carriage or head 50 which in turn is mounted at the front ends of swingable arms 51 mounted on a rear rock shaft 52, thus providing for the accurate opening and closing of the crimping jaws of the stitching mechanism.

Figs. 4 and 5 show the assembled components clamped between the clamp bars 21 and 22, and this transfer device is shown in Fig. 4 as being coupled or attached in proper location on the stitching machine by a positioning device in the form of a series of clips or small brackets 54, attached for example at the front of the fixed support 46. By this arrangement the work clamp is set into the stitching machine in such manner that the stitch line or axis of the lining piece falls directly above the stitching line or needle path S of the stitching machine, as indicated on Fig. 4.

Referring next to the assembling apparatus, this is shown as mounted upon a table or shelf 59. On top of the table is shown a platform 60 being in the nature of a board or plate, on top of which are attached, at each assembly point, a rear slab or plate 61 and a front slab 62. This construction is shown in Figs. 1 to 3, 6 and 7. Upon the rear slab 63, as Fig. 3 shows, is a marker or index 63, applied or attached in a position corresponding with the termination of the end hem B², thereby serving as a gage for the longitudinal position of the necktie facing.

It is to be understood that the slabs or plates 61 and 62 are spaced apart to receive the under work clamp bar, and that the fabric components are received on top of these slabs and properly gaged before clamping. The rear slab, near its front portion is provided with a cushion or friction layer 64 as of rubber, to hold better the positioned lining. This slab further is shown provided with a series of calibrated scales or transverse gage strips 65, the zero reading of each being at the stitching line or axis S; and the front slab 62 carries a complementary set of scales or calibrated strips 66; by which symmetrical scales the transverse gages may be initially properly adjusted. The rear and front plates or slabs 61 and 62 are spaced apart sufficiently to form a groove 68 between them of the proper width to receive snugly the under clamp bar 21, which may thus be set into the groove before assembling, and lifted out when the clamp is transferred. When the clamp is in assembling position the right end of the clamp bar 21 may be longitudinally positioned by an end gage, stop or block 69. To the rear of the slab 61 is shown a supplemental elevated member or bar 70, shown as a hollow metal tube, screw-attached to the platform 60, and giving support to the hold-down finger system as will be described.

Figure 13:
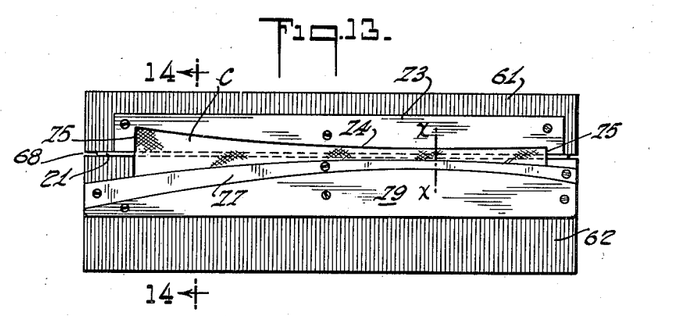
Fig. 13 is a top plan view of a modification or simplification showing certain essential principles hereof embodied without the use of a shiftable gage.
Figure 14:
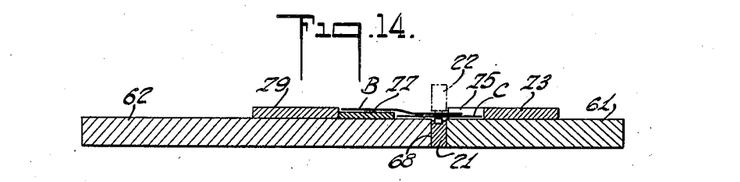
Fig. 14, looking from the right, is a vertical section view on the line 14—14 of Fig. 13.
Figure 15:
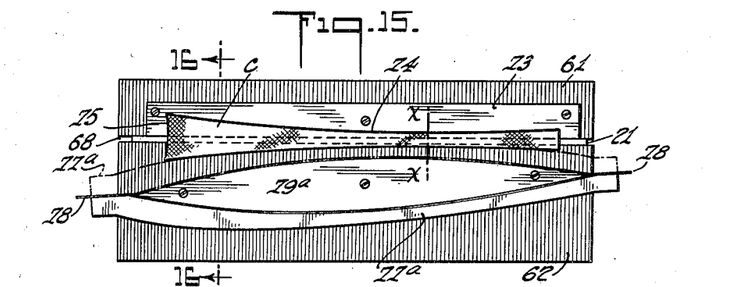
Fig. 15 is a top plan view of another simplified form wherein a shiftable lining gage is employed.
Figure 16:
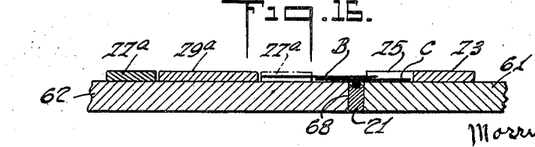
Fig. 16 looking from the right, is a vertical section thereof on the line 16—16 of Fig. 15.

Referring next to the transverse gaging system for the fabric components, these may best be first described in principle with reference to Figs. 13 to 16 whereon are shown the back and front slabs 61 and 62 spaced apart to form the groove or pocket 68 which receives the under clamp bar 21 prior to the assembling. These figures show a back gage 73 for the lining, which in each case may be stationary, having a side edge or contour 74 for the side of the lining piece and one or two end edges 75, for longitudinal gaging of the ends of the lining. This back lining gage 73 is mounted upon the rear slab 61. In Figs. 13 and 14 there is shown, mounted on the front slab 62, a front gage 77 for the lining, which in this embodiment is stationary on the slab. In Figs. 15 and 16 the corresponding front gage 77ᵃ is mounted movably, for example to swing about an axle 78, so as to shift from the dotted line to the full line position after the gaging of the lining. In Figs. 13 and 14 the front slab carries a front gage 79 for the facing, this being fixed upon the slab 62. As Fig. 14 shows, the fixed lining gage 77 is of lower depth than the facing gage 79 so that the latter presents a shoulder for the gaging of the folded edge of the facing blank, after the lining has been positioned between the gages 73 and 77. In Figs. 15 and 16 the facing gage 79ᵃ has its front edge so shaped that when the gage 77ᵃ is swung frontwardly it will be properly accommodated. In this embodiment, as the lining front gage 77ᵃ serves only temporarily, being retracted after the lining has been positioned, it may be of the same full height as the gages 73 and 79ᵃ. By these arrangements the accurate positionings, preferably first of the lining between the two lining gages, and thereupon the facing by the facing gage, are greatly facilitated; it being understood that the positioned components are preferably temporarily held down in place until the transfer clamp closes upon them.

The manual positioning of the lining C on the elevated or slab portions of the assembling table is readily effected, but the positioning and shaping of the facing thereon is a more intricate and difficult operation. The doubled front edge of the facing blank has to be accurately set to the contour of the rear edge of the facing gage, which is convex for this purpose. The fabric has to be pulled, moulded or otherwise manipulated into registration with this convex gage, thus concaving the contour of the doubled edge. This operation has the effect of substantially straightening the rear, open or raw edge of the folded material, which was originally cut on a concave curve. The predetermined convex contour of the facing gage, and its predetermined positioning with relation to the stitching line S and transferring clamp, compel the facing material to assume the exact desired condition, with its open margin B' extending beyond the stitching line and in the eventual product becoming concealed within the necktie adjacent to the concealed lining piece. It is desirable that the lining shall exactly fill the flattened tubular space within the completed and stitched facing, and this result is accurately secured by this invention. This will be explained more fully by the use of imaginary transverse construction lines or ordinates $x$—$x$, Fig. 1, etc. It may here be explained that the entire width of the lining along any ordinate should substantially equal the width of the folded facing at the same ordinate measured from its folded edge to the stitching line. The stitching line preferably falls in the center line or axis of symmetry of the lining, so that, at any ordinate, the facing width, all lying in front of the stitching axis, is twice the width of the half of the lining which lies in front of the axis; which gives a rule for the initial setting of the gages by the scales. The three gages may be preformed of the exact contours necessary for these purposes, but are preferably adjusted in use to the desired contours, which may vary somewhat in the manufacture of neckties of differing size or pattern.

The main embodiment as shown in Figs. 1, 3, 6, 7, 11 and 12 illustrates a back gage 81 for the lining, a front lining gage 82, shiftable or retractible from position after the lining is positioned, and a front gage 83 for the doubled edge of the facing. These preferably are adjustable to afford a reasonable range of contour alteration, according to variations in style or size of product. Preferably the rear gage 81 is first positioned and set and in conjunction with it the lining front gage 82, with perhaps an actual lining or pattern inserted for the purpose. By the aid of the scale pieces, back and front, the gages 81 and 82 may be set symmetrically with respect to the stitching axis SS, on which the scale zeros are based. The facing gage 83 may then be set so that at each ordinate it will stand twice as far from the axis as does the lining gage, so that the effective width of the doubled facing will equal the full width of the lining, as desired.

Figures 6, 7, 8, 9, 10:
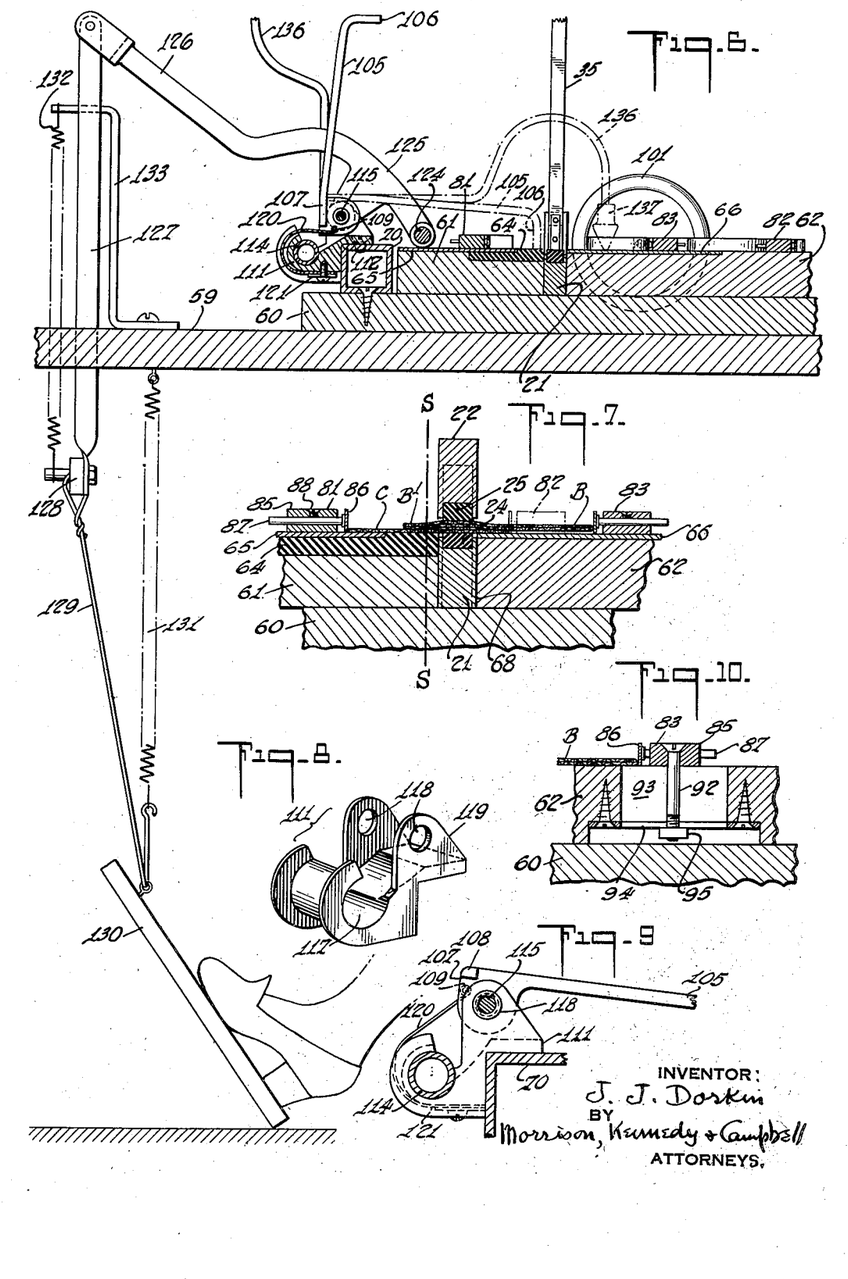
Fig. 6, looking from the left, is a vertical section taken on the line 6—6 of Fig. 1 and showing the parts in the same position thereas.
Fig. 7, on a larger scale than Fig. 6, and in the same vertical section thereas, shows a portion of Fig. 6 in further detail and with the lining and facing assembled, clamped and ready for transfer.
Fig. 8 is a detached perspective view of a certain hinge piece or knuckle, shown also in other figures, for the pivoting of the work holding fingers.
Fig. 9 is a left elevation of the hinge piece of Fig. 8 as applied to a certain stationary rear part of the assembling apparatus.
Fig. 10, looking from the left, is a vertical sectional view on the line 10—10 of Fig. 3 showing certain details of work gage construction.
Figure 11:
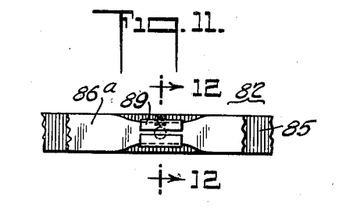
Fig. 11 is a partial front elevation showing certain details of gage construction of the shiftable gage for the lining piece.
Figure 12:
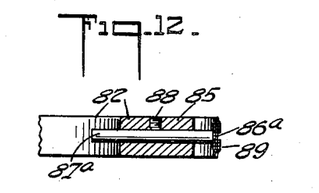
Fig. 12, looking from the left, is a vertical section on the line 12—12 of Fig. 11.

The gage may be as illustrated, as follows. Each of the three gages comprises a main portion or body 85 in the form of a curved bar, the curvature of its gaging edge being approximately that required for the product under manufacture, or a contour which is an average between expected variations of contour. In some cases the curved bar may afford the gaging edge, but as shown there is preferably a supplemental or flexible edge constituted by a spaced strip or spring 86. This springy defining edge strip is adjustably related to the gage bar by means of a system of pins 87 adjustably slidable through the bar. These pins or spacers may have heads engaging the flexible edge. As each pin is initially adjusted to its proper position it is there fixed by a set screw 88. These elements are best shown in Figs. 3 and 7. In the case of the shiftable gage 82 the spring strip or edge 86$^a$ is preferably formed with narrowed portions, as Figs. 11 and 12 show, engageable by small straps 89 provided at the heads of the pins 87$^a$, the straps being folded over the narrow portions of the strip, so as to hold the strip securely against detachment from the bar during the shifting of the gage. In all cases the gage spring strips are provided with tensioning means in the form of coil springs 90 at their ends, pulling them tightly into the position determined by the adjustment of the pins 87. By the described construction a composite gage is afforded which is readily adaptable to a considerable variation in contour or curvature. It may be flattened out by retracting the pins 87 near the longitudinal center and projecting further the pins near the ends, and vice versa.

Each of the gage bars 85 of the fixed gages is shown anchored in place by means of a system of vertical bolts 92, appearing in detail in Fig. 10. Each bolt extends through the bar and downwardly through a slot or groove 93 in the slab 61 or 62, and thence through the slot of a slotted plate 94 attached within an underneath recess of the slab, the bolt there carrying a nut 95$^b$ by which the adjusted bar may be secured firmly to the slab. Three of the anchoring bolts 92 are shown, and thus by giving the bar a certain degree of flexibility it may be initially strained from its normal curvature, thus affording an increased range of adaptation.

Figure 1:
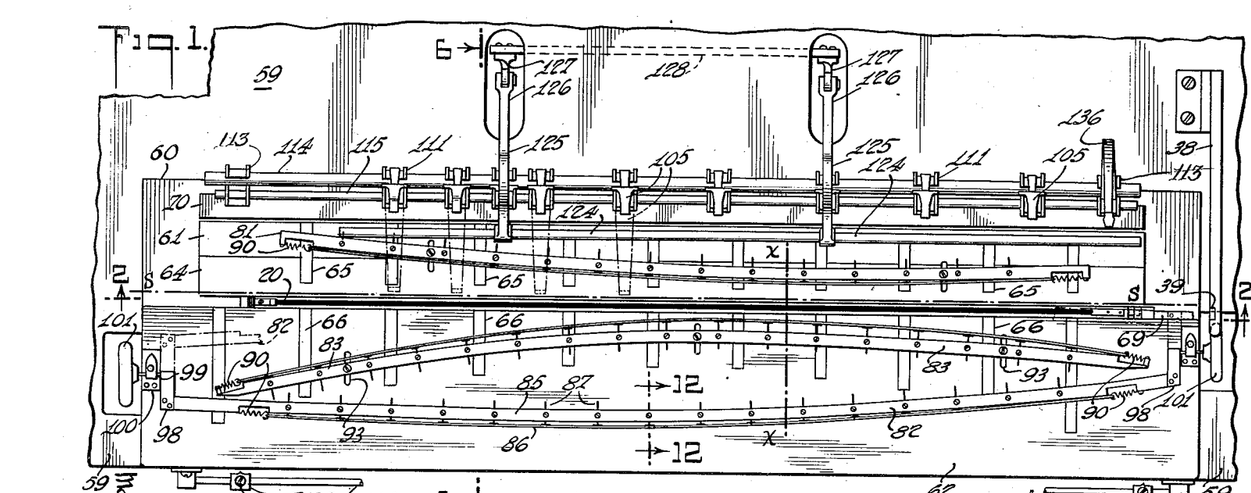
Fig. 1 is a top plan view of an assembling table and apparatus embodying the principles of this invention, shown in a position ready to receive the lining piece and facing component of the work.
Figure 2:
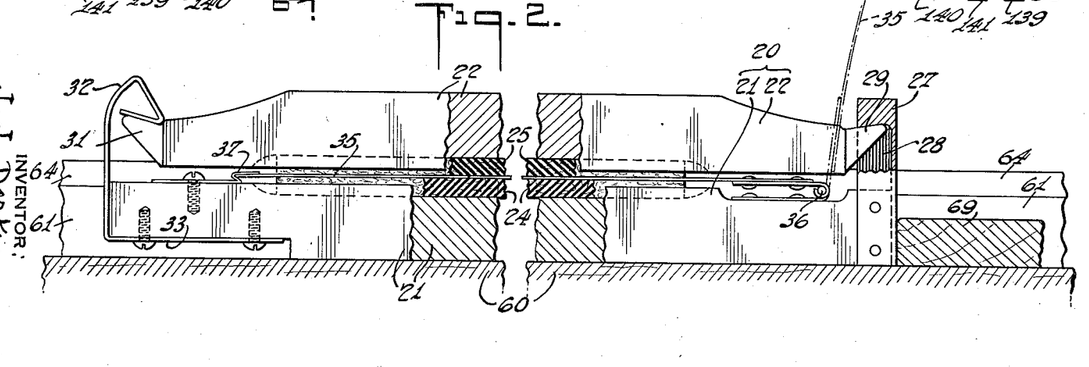
Fig. 2, looking from the front, is a vertical section on the line 2—2 of Fig. 1 or 3, and longitudinally condensed, showing particularly the work clamp device, this being in closed position but the work omitted.

The front lining gage 82 is adapted to be shifted from its initial position shown in Fig. 3 to its retracted position shown in Figs. 1 and 6. For this purpose the gage bar 85 is provided with an enlargement or hub 98 at each end, and from these hubs project axles 99, the two axles being in alinement with each other and extending through bearings 100 to exterior points, where the axles carry handles in the form of small wheels 101 by which the gage may be readily flopped over from initial to final position. The assembling gage system thus described corresponds in general principle with the simplified embodiment shown in Figs. 13 to 16, with refinements having substantial practical importance.

Next will be described the means for holding down the positioned facing blank B on top of the positioned lining piece C. As explained, the lining C has been gaged between the gages 81 and 82, and temporarily secured along its axis by the springy hold-down strip 35. After the gage 82 has been retracted, the refolded facing is then positioned by locating its doubled edge against the shoulder presented by the gage 83, this position being illustrated in Figs. 3 and 10, the extreme ends of the facing blank not requiring to be positioned or gaged. The positioning of the facing blank has to be done progressively along its length, to shape it snugly to the convex shoulder of the gage 83, and in order to hold temporarily each portion of the length of the blank as it is positioned, there is shown a system of hold-down fingers 105, located at various points along the length of the blank as may be desirable. The hold-down fingers 105 are preferably hinged at the rear so as to swing downwardly, each one independently of the others, and to come into position above the rubber cushion 64 of the rear pad 61, the contacting end of the finger thus clearing slightly the clamp device 21, 22. Thus, the doubled edge of the facing is manually set forward by the operator against the rear-facing shoulder of the gage 83, as he works along from the left to the right end or vice versa, the fingers 105 being snapped down to hold such adjustment, until at the end of this operation the two components are in correct relation to the stitching axis SS, whereupon the upper clamp bar 22 may be applied and locked, the fingers 105 retracted, and the clamp and assembled components transferred to the stitching mechanism.

The details of the hold-down fingers 105 are best shown in Figs. 1, 3, 6, 8 and 9. The contacting or holding end 106 of each finger is swingable from the elevated or retracted position shown in Figs. 1 and 6 in full lines to the lowered or holding position shown in dotted lines. The pivoted end of each finger is formed with a forked hub 107 having lateral corner lugs or stop projections 108, and the hub carries also a cross pin 109 for a spring 120 to be described. Each of such fingers 105 is pivoted upon a carriage or slide 111. Fig. 1 indicates nine of such sliding carriages or knuckles 111, and preferably at the end are special carriages 113 fixed against adjustment by means of screws 112 (Fig. 6) attaching them to the hollow square bar 70; the remaining carriages may be slid along at will to apply the fingers to such points along the length of the facing as may most require holding. Thus the end carriages 113 may be fixed, to hold the rods 114 and 115 to be mentioned, while the nine carriages 111 are adjustable longitudinally along the square bar 70 and along said rods. The back rod 114 is shown as hollow for lightness while the top rod 115, of smaller diameter, is shown solid. These rods are held fixedly by the end carriages 113. Each of the carriages is formed with an aperture 117 by which it engages the back rod 114, and each carriage has a round aperture 118 to engage the rod 115, which forms the pivot for the hold-down fingers 105. Each of the fingers is so mounted on the rod 115 and carriage 111 that it tends to retain its lowered position shown in Fig. 9 or its raised position shown in Fig. 6, being actuated by a spring or snap action by means of a spring 120 anchored at 121 on the carriage. Thus Fig. 6 in full lines shows the finger yieldingly held in its raised position, the curved spring 120 having been compressed until its extremity, anchored to the carriage pin 109, presses forwardly on the pin in a direction to hold the finger in the open position, in which position the stop lugs 108 bear against the rear edges of the ears 119 in which the apertures 118 are formed. As the operator pulls each finger frontwardly and down, the action of the spring 120 is reversed so that, as shown in Fig. 9, its stress is applied to lift the rear corner of the finger and thereby depress its front contact end downwardly upon the work. A ready means is thus provided of clamping temporarily but securely each portion of the length of the work as the components are gaged and positioned. As already stated, when the gaging of the facing is completed the clamp 21, 22 is applied to the goods, dispensing with the further presence of the hold-down fingers.

To facilitate the retraction of all of the hold-down fingers 105, they are shown as simultaneously liftable by means of a retractor or lifting rod 124, shown in Figs. 1, 3, 6 and 9. The horizontal lifting rod 124 is mounted at the forward ends of a pair of bent levers 125 pivoted upon the top rod 115. In order to raise the lifting rod 124, the levers 125 have rear upward extensions 126, each connected by a depending link with a common horizontal bar 128 which has only to be lowered to restore the fingers to retracted position. To lower the bar 128 there is shown a pulling rod, cord or chain 129 extending from the rod downwardly to a pedal 130, representing any lever or shifter adapted to actuate the described connections. To restore the lifting rod 124 and connected parts there are shown a spring 131 pulling upwardly on the pedal 130 and chain 129, and a spring 132 pulling upwardly on the bar 128. The spring 131 is attached to the under side of the table 59 and the spring 132 to a bracket 133 upstanding from the table.

In addition to the regular hold-down fingers 105 there is preferably provided, at one or each end of the table, a special or arched hold-down finger 136, this being of extended length as shown in Figs. 3 and 6 so as to reach over beyond the axis with its contact end or head 137 thereby arranged to come down upon the loose fabric end of the facing, to hold it suitably disposed, thereby not to interfere with the clamping and subsequent stitching operations. This special finger may be brought down by hand, as are the other fingers, and may be restored by the same lifting rod 124 after the fabric has been clamped.

To avoid a certain difficulty in distortion of facing material during assembling a special supplemental gaging means is shown in Fig. 1, comprising, near each end of the machine, at the front, a gage block 139 adapted to slide along a longitudinal rod 140 fixedly mounted on the slab 62 for this purpose. For each batch of work the gage blocks 139 will be set to indicate the points where the extreme ends of the facing material should fall when the components have been assembled. This prevents lack of uniformity due to hasty assembling operation. For example if the neckties are to be of a length of say 46 inches, the block gages will afford a guide in securing this purpose. Otherwise, due either to non-uniform handling, or due to irregularity in the blanks, the material may be stretched or distorted endwise, so that in the completed product the length will be greater than desired. The stretch of the material permits this, and the error may vary with successive products. The gages 139 indicate where the tip ends of the facing silk should terminate, thus promoting uniformity in the product. The gages 139 may be mounted adjustably in any manner upon the front slab 62, the arrangement shown being merely illustrative. In using the terms front and back in this specification, or terms like right and left, they are used in a relative sense, and are not intended as limitations upon the structure or method, since manifestly the relative positions and directions may be variously altered or reversed without departing from the principles of the invention.

The operation has been generally indicated. The lining and facing gages having been previously adjusted for a given style or width of necktie the lining C is laid between the gages 81 and 82. Owing to the symmetrical curvature this compels the lining to be set properly both widthwise and lengthwise. By using an end gage for the lining the rear gage may serve without any front gage, but the shown arrangement gives positive positioning of the lining.

The under clamp bar having been previously inserted, with its upper face below the assembling level, the lining C now overlies the slabs 61 and 62 and the rubber pad of the clamp bar. The spring hold-down strip or wire 35 is then brought down and latched in position to hold the lining upon the clamp bar, as Fig. 3 best shows. If a tape is included it will be set axially on the lining, and the spring gage 35 caused to confine it in place. The front gage 82 is retracted and swung away to permit insertion of the facing blank. While it is preferred that the axis of the lining piece coincide with the stitching axis SS, exact correspondence between them is not essential if not objectionable in the final product. Indeed in certain cases, for special styles, the lining may be wholly or partly offset from symmetry to the stitching axis, and the facing of course correspondingly offset; namely, by suitably repositioning or reshaping the respective gages, as at their ends, whereby in the product the stitchline will swerve from the necktie axis near the ends, as may sometimes be desirable.

The redoubled facing is next laid over the positioned lining, with its folded edge frontward against the gage 83. The facing thus overlies part of the lining and completely covers and conceals the lining hold-down strip 35. The folded edge of the facing is naturally approximately straight, but being quite elastic it is very easily moulded to a concave contour, as Fig. 3 shows, into contact with the convex edge of the gage. This accurately determines the width of the facing piece at each ordinate $x$—$x$, for example at the position of each of the scales 66. The width of the lining, at any ordinate, or the distance between gages 81 and 82, corresponds with the sum of the readings of the symmetrical scales 65 and 66 thereat, the gages 81 and 82 having been accurately set thereto; and the double-ply facing is now positioned by the accurately set gage 83 so as to have at such ordinate a full width, from stitching line S to the doubled edge, equal to the full width of the lining at such point, with perhaps a slight allowance or clearance to ensure the accommodation of the lining within the subsequently reversed facing.

The manual adjusting of the facing to the front gage is under close inspection and is readily performed, leaving the raw rear edge of the facing in an approximately straight condition, somewhat beyond or to the rear of the stitching line. This operation, under complete control of the operator, permits manipulation to correct certain defects frequently appearing at the edges of necktie facing blanks, which sometimes are built up of two or more pieces of silk connected along diagonals. Due to this system and other reasons there may be defects, such as notches, indentations or tears near the rear edge of the folded material. The operator in such cases may readily shift one ply relatively to the other, thus offsetting the raw edges and slightly relocating the folded edge, such resetting of the plies operating so that any such defect may be actually shifted beyond the stitching line S. In other words, thus disalining the raw edges, the one containing the defect may be so repositioned that the defect will fall beyond this line S and not appear in the finished product, but will be concealed within the facing material, along with the lining piece to which the facing is stitched.

As fast as the facing blank is thus located against its gage, and readjusted as necessary, it is confined in place by snapping down the successive fingers 105, which permit supplemental readjustment, if inspection now discloses any defect, before clamping. The ends of the facing blank are now disposed so as not to interfere with the stitching operation, and the clamp bar 22 is next applied and locked, the hold-down fingers are all retracted by the pedal, and the clamp and work are extracted and transferred to the stitching machine to be slipstitched along the line SS in the manner already described.

While the lining piece has been described as laid down before the facing blank, and this is preferable, yet, in a broad aspect the assembling and gaging can be performed with the facing placed and adjusted first and the lining overlaid thereupon. In such case the hold-down fingers should be transposed to the front and designed to be applied upon the facing in a manner not to interfere with the placing of the lining, or the facing can be held down by suction; and the shiftable front lining gage, if used, may then be brought down upon the facing preparatory to the placing of the lining and the closing of the transfer clamp. As regards the inventive features pertaining to the assembling and clamping of the necktie components it is to be understood that the subsequent stitching may be performed by any appropriate type of stitching mechanism, or even by hand.

A major advantage of the present invention is its capability of high speed production and large output for a given labor expense. In previous systems the attempt to speed up the assembling process has frequently resulted in a product noticeably lacking in uniformity, especially so far as the silk facing components are concerned. By the present invention imperfections and variations in these blanks are taken care of so that they do not substantially impair the product. The principle of improvement underlying these advantages is that the assembling is performed, not from the variable and uncertain cut or open edges of the blank, but on the contrary from the opposite or folded and therefore uniform edge, so that the place where the cut or raw edge falls may be variable, being determined by the gaging of the closed edge or fold. Thereby the results are proper and reliable, the fold being definitely positioned by its gage, and the stitching axis definitely determined in relation thereto, the raw or cut margins extending beyond the stitching axis being of no moment except to assure a substantial width of material beyond the seam.

What is claimed is:

1. An apparatus for assembling the lining component and the refolded facing component of a necktie preparatory to stitching them together, comprising a table to receive at length the successively placed lining and facing components, and convexly contoured gages thereon for edges of the respective components, at least one of said gages comprising a bent or curved bar, a flexible gaging strip extending along and spaced adjacent from the bar, and means between the bar and strip for varying the spacing of the strip from the bar.

2. An apparatus as in claim 1 and wherein the gage bar has means adjustably securing it upon the table, and the spaced strip has end means for holding its place by tension.

3. An apparatus as in claim 1 and wherein the gage bar is bendable and has means to fix it to the table in varying bent positions.

4. A necktie assembling apparatus for locating and clamping the components in preparation for stitching, comprising an assembling table having gage means to locate the necktie lining and refolded facing components placed flatwise thereon at length in stitching relation to each other, a work holding and transferring clamp having rigid under and upper clamp bars to hold between them at length such assembled components for transfer of the assemblage from the table to a stitching mechanism, the assembling table having a longitudinal recess to accommodate the rigid under clamp bar of the clamp below the assembling level during assembling, the clamp having at one of its ends means to couple together the ends of its clamp bars, and a separate releasable means for locking together the two bars at the other end, thereby to hold the clamp in closed position clamping the assemblage at length and under rigid pressure before and during transfer from the table, and the clamp having means for locating and holding the clamp in stitching position on the stitching mechanism; there being combined with the said clamp under and upper bars, as a part of said clamp, a flat thin holddown strip, the same having means to attach its ends to the ends of the under bar, whereby after one component has been positioned the thin strip may be attached to hold said component down during the positioning of the other component before final clamping.

5. A necktie assembling apparatus for locating and clamping the components in preparation for stitching, comprising an assembling table having longitudinal gages to locate the necktie lining and folded facing components placed flatwise thereon at length in stitching relation to each other and to the stitching line, a transferable work holding and carrying clamp having completely separable under and upper clamp bars to clamp between them at length such assembled components along a line offset to the stitching line for transfer of the assemblage from the table to a stitching mechanism, the assembling table being constructed to receive and accommodate the under and upper bars of the clamp, with a groove to receive the under bar below the assembling level, the clamp bars having at one end a loose coupling to connect them at that end and at the other end a locking latch thereby to lock and hold closed the clamp bars to hold the assemblage, for bodily removal from the table; there being combined with the said clamp under and upper bars, as a part of said clamp, a flat thin holddown strip, the same having means to attach its ends to the ends of the under bar, whereby after one component has been positioned the thin strip may be attached to hold said component down during the positioning of the other component before final clamping.

6. A necktie assembling apparatus for locating and clamping the components in preparation for stitching, comprising an assembling table having gage means to located the necktie lining and folded facing components placed flatwise thereon at length in overlapping stitching relation to each other, a transferable work carrier or clamp having under and upper clamp bars cooperable to hold between them such assembled components for transfer of the assemblage from the table to a stitching mechanism, the assembling table having a longitudinal recess to accommodate the under clamp bar of the carrier below the assembling level during assembling, the carrier having a thin flexible hold-down strip adapted to be laid down on top of the first component to hold it during the gaging of the second component and having also means at the ends of the carrier to hold or latch its clamp bars in closed position clamping the assemblage, with the hold-down strip between the components, and the carrier having means for locating and holding the carrier in stitching position on the stitching mechanism.

7. An apparatus for assembling the lining component and the refolded facing component of a necktie preparatory to stitching them together, comprising a table to receive and support flatly at length the successively placed lining and facing components, gage means on the table to locate the lining in symmetrical relation to an imaginary stitching axis, with which axis the lining center line substantially coincides, and a facing gage spaced transversely from and at one side of the lining location and formed with a substantially continuous convex gaging contour which at every transverse ordinate is spaced away from the lining center line by a distance substantially equalling the full width of the lining at such ordinate and therefore a half-width beyond the edge of the lining, whereby when the refolded facing is laid and shaped with its fold or doubled edge conforming to such convex gage contour its open edge will lie adjacent to and with the margins of both plies somewhat overlying the stitching axis or center line of the lining, and means for clamping together the so placed and assembled components to preserve their gaged relation until stitched together along such line.

8. In necktie making apparatus in combination with an interchangeable work clamp comprising rigid under and upper bars to clamp flatly at length the assembled lining and facing components of a necktie for transfer to stitching means; an assembling table having front and rear longitudinal portions with an intermediate recess to receive the under clamp bar in a position to offset from the stitching line, and below the assembling level, whereby the components overlie the under bar, and means for gaging the positions first of the lining and then of the refolded facing components of the necktie in relation to the stitching line before the closing of the clamp; together with a thin, flat and flexible hold-down strip adapted to overlie the under clamp bar after the lining has been gaged and on top of the lining to hold the lining in position during the gaging of the facing, the position of said strip being such as to be wholly covered by the subsequently gaged facing and confined between the closed clamp bars.

9. An apparatus for assembling the lining component and the refolded facing component of a necktie preparatory to clamping and stitching them together, comprising a table to receive at length the successively placed components, the table supporting a rear lining gage, and an opposed lining gage at the front, said two gages being convex toward the stitching line and defining the lining position, and a continuous facing gage on said table in front of the front lining gage, spaced from the contour of the lining and convex toward the stitching line, for defining the position of the folded front edge of the refolded facing so that the facing and lining will overlap at the stitching line and the front lining gage being swingable away from gaging position frontwardly and downwardly in front of the facing gage, to facilitate the placing and gaging of the facing; together with clamp means to clamp flatly at length the so assembled components for transfer from the assembling table to stitching mechanism.

10. A work transferring clamp for an apparatus for assembling necktie lining and facing components, comprising a rigid under clamp bar, a thin flexible hold-down strip connectible to the under bar at its two ends above one and below the other of the components of the work, and a rigid upper clamp bar adapted to be clamped by its two ends to the ends of the lower bar to hold together the assembled components, with the hold-down strip between the bars and components, for transfer from assembling to stitching position.

JOSHUA JEROME DORKIN.